(12) United States Patent
McWilliams

(10) Patent No.: US 6,272,547 B1
(45) Date of Patent: *Aug. 7, 2001

(54) HIGH LEVEL CONTROL OF FILE TRANSFER PROTOCOL WITH CAPABILITY FOR REPEATED TRANSFER ATTEMPTS

(75) Inventor: Gavin McWilliams, Belfast (GB)

(73) Assignee: British Telecommunications public limited company, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/737,732
(22) PCT Filed: May 19, 1995
(86) PCT No.: PCT/GB95/01139
§ 371 Date: Jan. 3, 1997
§ 102(e) Date: Jan. 3, 1997
(87) PCT Pub. No.: WO95/32573
PCT Pub. Date: Nov. 30, 1995

(30) Foreign Application Priority Data

May 19, 1994 (EP) .................................................. 94303597

(51) Int. Cl.$^7$ ........................... G06F 15/16; G06F 15/173
(52) U.S. Cl. .......................................... 709/232; 709/238
(58) Field of Search .............................. 395/200.3, 200.6, 395/200.49, 200.62, 200.63, 200.64, 200.65, 285, 200.33; 709/219, 232, 233, 234, 235, 238

(56) References Cited

U.S. PATENT DOCUMENTS

| 4,642,758 |   | 2/1987  | Teng ..................................... 364/200 |
| 4,649,473 | * | 3/1987  | Hammer et al. ...................... 364/200 |
| 4,942,540 | * | 7/1990  | Black et al. ......................... 364/514 |
| 4,999,766 | * | 3/1991  | Peters et al. ......................... 364/200 |
| 5,162,986 | * | 11/1992 | Graber et al. ........................ 364/146 |
| 5,276,810 | * | 1/1994  | Kitamura et al. .................... 395/250 |
| 5,408,608 | * | 4/1995  | Rye et al. ............................ 395/200 |
| 5,448,759 | * | 9/1995  | Krebs et al. ......................... 455/54.1 |
| 5,592,620 | * | 1/1997  | Chen et al. ..................... 395/200.01 |
| 5,692,194 | * | 11/1997 | Nguyen et al. ...................... 395/680 |

FOREIGN PATENT DOCUMENTS

| 0413074 A1 | 2/1991 | (EP) . |
| 3-168846   | 7/1991 | (JP) . |
| 3-185535   | 8/1991 | (JP) . |

OTHER PUBLICATIONS

DeSchon, A., et al., "Background File Transfer Program," Network Working Group, RFC 1068, Aug. 1988.*
"Open Systems Interconnection" published in the Encyclopedia of Computer Science, 3$^{rd}$ Edition, Van Nostrand Reinhold 1993.
Linington, "File Transfer Protocols", IEEE Journal of Selected Areas in Communication, vol. 7, No. 7, Sep. 1989, New York US, pp. 1052–1059.

* cited by examiner

Primary Examiner—Glenton B. Burgess
Assistant Examiner—Kenneth W. Fields
(74) Attorney, Agent, or Firm—Nixon & Vanderhye P.C.

(57) ABSTRACT

In order to transfer a series of data files between two computers, each computer is provided with a file transfer mechanism. The file transfer mechanism is responsible for the overall control of the transfer of the series of files. Each file transfer mechanism controls the transfer of a series of files in accordance with a protocol. In this protocol, the computer receiving data files (the initiator) sends a poll request message to the computer transmitting the data files (the responder). In response, the responder sends a reply message to the initiator containing a list of files which are available for transfer. From this list, the initiator selects the files which it wishes to receive and then copies each file in turn. It then sends an acknowledge to the responder.

15 Claims, 5 Drawing Sheets

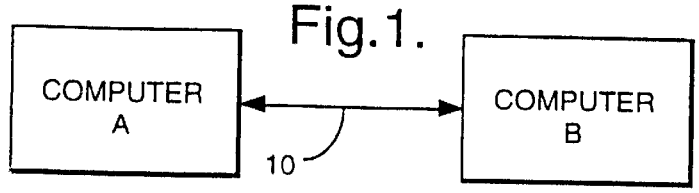
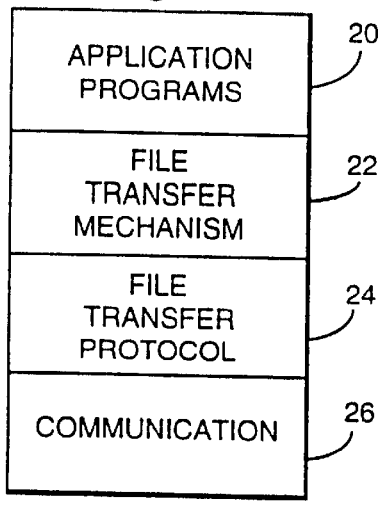
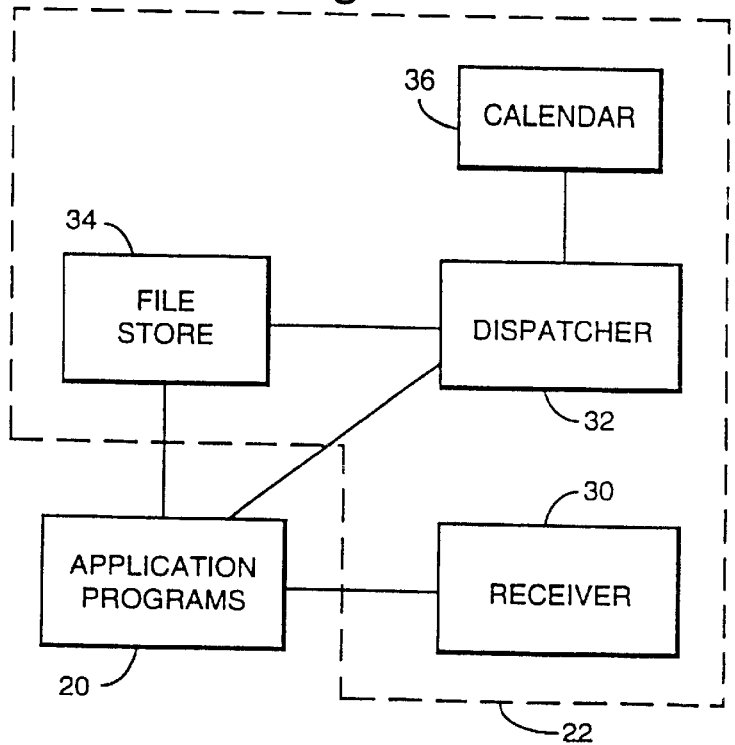

Fig.8.

|              | 0 IDLE  | 1 POLL | 2 ACK  | 3 DELAY | 4 ALARM | 5 MESSAGE |
|--------------|---------|--------|--------|---------|---------|-----------|
| POLL req     | 1 (A0)  |        |        |         | 1 (A4)  |           |
| POLL RESP ind|         | 2 (B1) |        |         |         |           |
| POLL ACK ind |         | 3 (C1) |        |         |         |           |
| ACK req      |         |        | 0 (D2) |         |         |           |
| ALARM ind    | 4 (E0)  |        |        |         | 4 (E3)  |           |
| MESSAGE req  | 5 (F0)  |        |        |         |         |           |
| RESPONSE ind |         |        |        |         |         | 0 (G5)    |
| TIMEOUT ind  |         | 1 (H1) |        |         |         | 5 (H5)    |

INITIATOR STATE TABLE

Fig.9.

|              | 0 IDLE  | 1 POLL | 2 ACK  | 3 DELAY | 4 ALARM | 5 MESSAGE |
|--------------|---------|--------|--------|---------|---------|-----------|
| POLL ind     | 1 (A0)  |        |        |         | 1 (A4)  |           |
| POLL RESP req|         | 2 (B1) |        |         |         |           |
| POLL ACK req |         | 3 (C1) |        |         |         |           |
| ACK ind      |         |        | 0 (D2) |         |         |           |
| ALARM req    | 4 (E0)  |        |        |         | 4 (E3)  |           |
| MESSAGE ind  | 5 (F0)  |        |        |         |         |           |
| RESPONSE req |         |        |        |         |         | 0 (G5)    |
| TIMEOUT ind  |         |        |        |         | 4 (H4)  |           |

RESPONDER STATE TABLE

HIGH LEVEL CONTROL OF FILE TRANSFER PROTOCOL WITH CAPABILITY FOR REPEATED TRANSFER ATTEMPTS

BACKGROUND OF THE INVENTION

1. Field of the Invention

This invention relates to a file transfer mechanism for transferring a series of data files from one computer to another computer and also to a method of transferring a series of data files from one computer to another computer.

2. Related Art

EP-A-0 413 074 discloses a method of managing the transfer of data files between a workstation and a host computer. The workstation is provided with an application program which manages the transfer of files between the workstation and the host computer.

When transferring a large series of files from one computer to another computer, it is desirable to do so in a manner which does not cause problems for the computer receiving the files and which enables the files to be transferred in a reliable manner.

SUMMARY OF THE INVENTION

According to a first aspect of this invention there is provided a computer having a mechanism for transferring a series of data files between said computer and another computer, said file transfer mechanism being arranged to transfer a series of files between said computer and another computer in accordance with a protocol for transferring a series of files from a first computer (the transmitting computer) to a second computer (the receiving computer) which includes the following sequence of operations: (i) the receiving computer sends a poll message to the transmitting computer asking for a list of files which are available for transfer; (ii) the transmitting computer sends a reply message to the receiving computer containing a list of files which are available for transfer; and (iii) the receiving computer selects files from the list received from the transmitting computer and attempts to copy each selected file.

The protocol used in the file transfer mechanism of this invention provides the advantages that the files are transferred at a time selected by the receiving computer and that only those files which have been selected by the receiving computer are transferred. Also, because the files are copied under the control of the receiving computer, the protocol provides the further advantage that the files may be copied in a reliable manner.

According to a second aspect of this invention, there is provided a computer having a mechanism for transferring a series of data files between said computer and another computer, said file transfer mechanism being arranged to transfer a series of between said computer and another computer in accordance with a protocol for transferring a series of files from a first computer (the transmitting computer to a second computer (the receiving computer) which includes the following sequence of operations: (i) the transmitting computer sends a message to the receiving computer stating that it has files available for transfer; (ii) the receiving computer sends a poll message to the transmitting computer asking for a list of files which are available transfer; (iii) the transmitting computer sends a reply message to the receiving computer containing a list of files which are available for transfer; and (iv) the receiving computer selects files from the list received from the transmitting computer and attempts to copy each selected file.

According to a third aspect of this invention there is provided a computer having a mechanism for transferring a series of data files between said computer and another computer, said file transfer mechanism being arranged to transfer a series of files between said computer and another computer in accordance with a protocol for transferring a series of files from a first computer (the transmitting computer) to a second computer (the receiving computer) which includes the following sequence of operations: (i) the receiving computer sends a poll message to the transmitting computer asking for a list of files which are available for transfer; (ii) the transmitting computer sends a poll message to the receiving computer stating that there will be a delay in providing a list of files available for transfer; (iii) after a delay the transmitting computer sends a further message to the receiving computer stating that it has files available for transfer; (iv) the receiving computer sends a poll message to the transmitting computer asking for a list of files which are available for transfer; (v) the transmitting computer sends a reply message to the receiving computer containing a list of files which are available for transfer; and (vi) the receiving computer selects files from the list received from the transmitting computer and attempts to copy each selected file.

According to a fourth aspect of this invention there is provided a method of transferring a series of data files from a first computer (the transmitting computer) to a second computer (the receiving computer) including the steps of: (i) the receiving computer sending a poll message to the transmitting computer asking for a list of files which are available for transfer; (ii) the transmitting computer sending a reply message to the receiving computer containing a list of files which are available for transfer; and (iii) the receiving computer selecting files from the list received from the transmitting computer and attempting to copy each selected file.

According to the fifth aspect of this invention there is provided a method of transferring a series of data files from a first computer (the transmitting computer) to a second computer (the receiving computer) including the steps of: (i) the transmitting computer sending a message to the receiving compute stating that it has files available for transfer; (ii) the receiving computer sending a poll message to the transmitting computer asking for a list of files which are available for transfer; (iii) the transmitting computer sending a reply message to the receiving computer containing a list of files which are available for transfer; and (iv) the receiving computer selecting files from the list received from the transmitting computer and attempting to copy each selected file.

According to a sixth aspect of this invention, there is provided a method of transferring a series of data files from a first computer (the transmitting computer) to a second computer (the receiving computer) including the steps of: (i) the receiving computer sending a poll message to the transmitting computer asking for a list of files which are available for transfer; (ii) the transmitting computer sending a reply message to the receiving computer stating that there will be a delay in providing a list of files available for transfer; (iii) after a delay the transmitting computer sending a further message to the receiving computer stating that it has files available for transfer; (iv) the receiving computer sending a poll message to the transmitting computer asking for a list of files which are available for transfer; (v) the transmitting computer sending a reply message to the receiving computer containing a list of files which are available for transfer; and (vi) the receiving computer selecting files from the list received from the transmitting computer and attempting to copy each selected file.

BRIEF DESCRIPTION OF THE DRAWINGS

This invention will now be described in more detail, by way of example, with reference to the drawings in which:

FIG. 1 is a block diagram of two computers between which a series of files may be transferred and each of which embodies this invention;

FIG. 2 is a block diagram showing the software components of one of the computers of FIG. 1;

FIG. 3 shows the individual parts of the file transfer mechanism component of the software and the relationship between these processes and the application programs component of the software;

FIG. 8 is a table illustrating the relationship between the states of a finite state machine used in a computer receiving data files and associated events;

FIG. 9 is a table illustrating the relationship between the states of a finite state machine used in a computer transmitting data files and associated events;

DETAILED DESCRIPTION OF EXEMPLARY EMBODIMENTS

Referring now to FIG. 1, there are shown two computers, namely, computer A and computer B between which data files may be transmitted via a communications link 10. As will be explained in more detail below, each of computers A and B is provided with a file transfer mechanism embodying the invention and which is used in transferring data files. Each of computers A and B uses a UNIX operating system. Each of computers A and B may also transmit data files to, and receive data files from, other computers, not shown.

Figure 10:
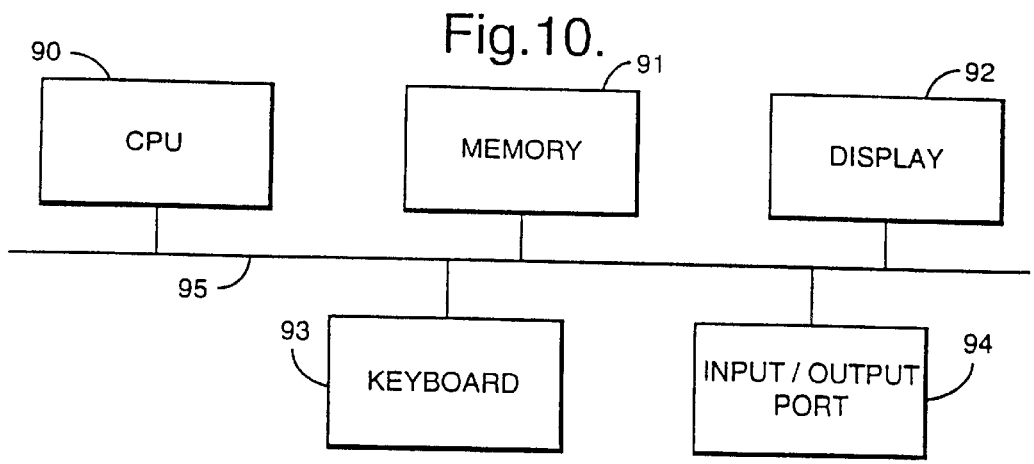
FIG. 10 shows the hardware components of each of the computers shown in FIG. 1.

The main hardware components of each of computers A and B are shown in FIG. 10. These hardware components comprise a central processing unit (CPU) 90, memory 91, a visual display unit 92, a keyboard 93 and an input/output port 94 connected together by a bus 95. The port 94 is used to connect the computer to the communications link 10 and may be used to connect the computer to other devices such as a printer. The computer software, including data, is stored in the memory 91.

Figure 11:
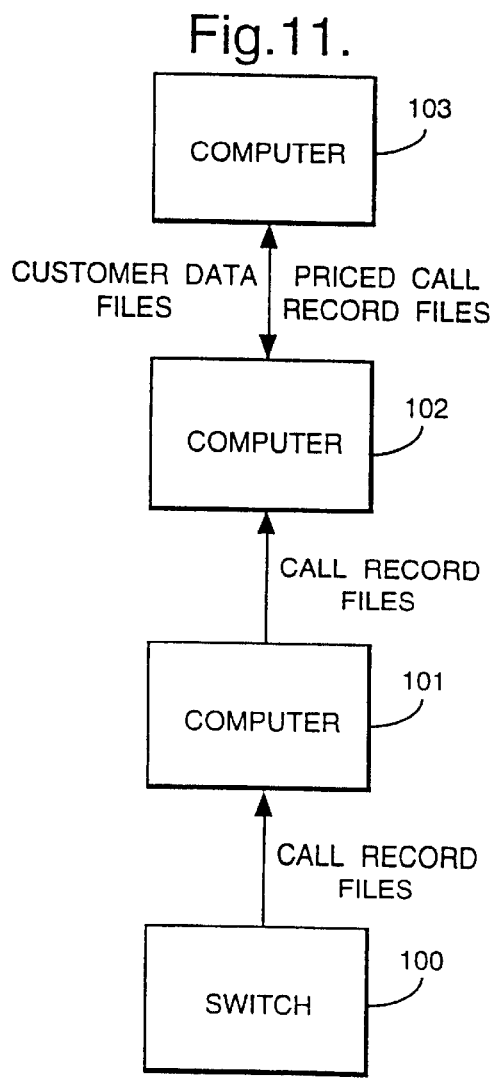
FIG. 11 is a block diagram of a system for billing telecommunications calls.

The present invention is particularly suitable for transferring a series of data files from a computer which produces such files in very large numbers. Examples of such computers may be found in a system for billing telecommunications calls. Referring to FIG. 11, there is shown an example of a system for billing telecommunications calls. The system comprises a telecommunications switch (or exchange) 100, which is part of a network of switches, and three computers 101, 102, 103. The switch 100 generates files containing records of individual telecommunications calls. The files are transferred to computer 101 which performs preliminary processing operations on the files in preparation for transferring the files to computer 102. The computer 102 receives the call record files from computer 101 and also files containing data relating to the individual customers of the network from the computer 103. Using the data relating to individual calls contained in the call record files and the data relating to the individual network customers contained in the customer data files, the computer 102 prices the individual calls and produces files containing records of the priced calls. The priced call record files are transferred to the computer 103. The computer 103 uses the priced call records to produce bills for the individual customers. Each of the computers 101, 102 and 103 is provided with a file transfer mechanism embodying the invention. These file transfer mechanisms are used for transferring the call record files from computer 101 to computer 102, the priced call record files from computer 102 to computer 103, and the customer data files from computer 103 to computer 102. This invention will now be described further with reference to computers A and B shown in FIG. 1.

Referring now to FIG. 2, there are shown the main components of the software (in addition to the operating system) of each of the computers A and B. These components comprise an application programs component 20, a file transfer mechanism component 22, a file transfer protocol component 24 and a communication component 26. The application programs component 20 comprises one or more application programs and the nature of these programs will depend upon the operations performed by the computer. For example, where the computer forms part of a billing system, the application programs will perform the functions required of that computer within the billing system. The details of such application programs do not form part of the present invention. The file transfer mechanism component 22 is responsive for the transfer of a series of files between the computer and another computer and thus provides overall control of each transfer of a series of files. The file transfer protocol component 24 is responsible for ensuring each file is copied in a reliable manner. The file transfer mechanism component 22 will be described below in grater detail. In the present example, the file transfer protocol component 24 uses the File Transfer Protocol (ftp) available on a UNIX operating system. By-way of an alternative, the file transfer protocol component 24 may use the File Transfer and Access Management (FTAM) protocol of Open Systems Interconnection (OSI). The communication component 26 is responsible for controlling the transmission of individual bytes of data between the computer and another computer and, in the present example, the communication component 26 uses the two well known protocols known by the collective name TCP/IP and these two protocols are available on UNIX operating systems.

Referring now to FIG. 3, there are shown the parts of the file transfer mechanism 22 and the relationship of these parts with the application programs 20. The parts comprise a receiver 30, a dispatcher 32, a file store 34 and a calendar 36. The receiver 30 is responsible for receiving data files from another computer and it transfers received files to a database for use by one or more of the application programs 20. Data files generated by one or more of the application programs 20 are transferred to the file store 34 in preparation for transfer to one or more other computers. Where the computer transmits files to only one other computer, the data files are stored in a single queue. Where it transmits files to more than one computer, the data files are stored in an individual queue for each of the other computers. Thus, the queue or each queue of data files forms a series of files which are available for transfer to another computer.

The dispatcher 32 is responsible for transmitting files from the file store 34 to one or more other computers. The file transfer mechanism 22 provides the opportunity for data files to be transmitted to other computers in accordance with a pre-defined schedule. Where data files are transmitted in accordance with the schedule, the calendar 36 provides the necessary time keeping function.

The transfer mechanism 22 is responsible for controlling each transfer of a series of files between the computer in which it is located and another computer. Each transfer is controlled in accordance with a protocol which is illustrated in FIGS. 4 to 7. This protocol provides a basic service illustrated in FIG. 4, an alarm service illustrated in FIG. 5, a delayed service illustrated in FIG. 6 and a message service illustrated in FIG. 7. In each of FIGS. 4 to 7, the computer which is receiving data files is referred to as an "initiator" and a computer which is transmitting files is referred to as a "responder ".

Figure 4:
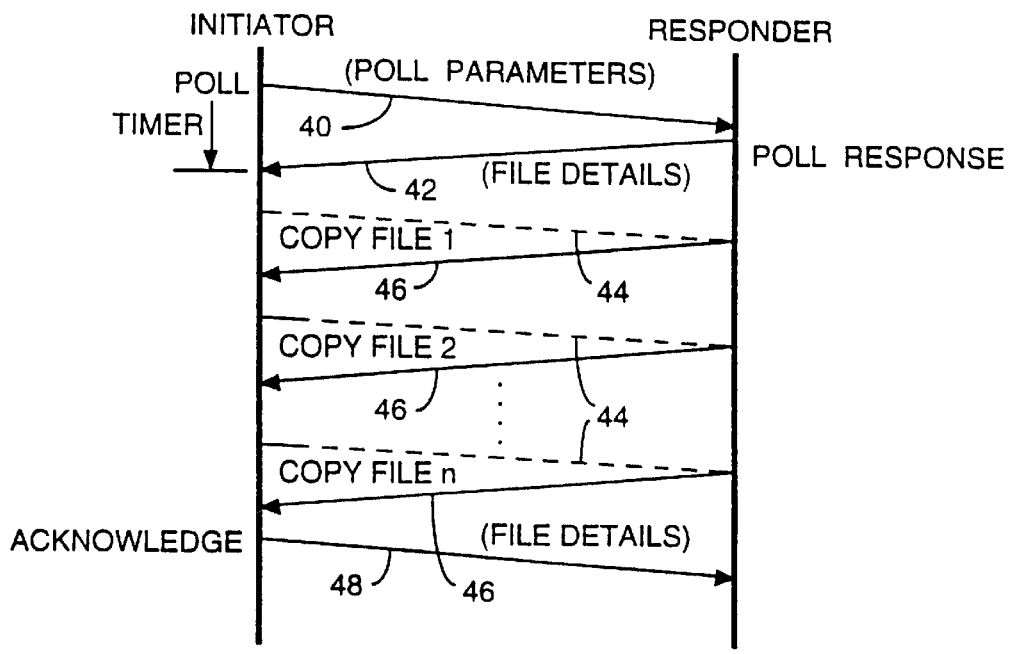
FIG. 4 is a graph illustrating a basic service provided by a protocol used in the file transfer mechanism.

Referring now to FIG. 4, in the basic service, in order to commence each transfer of a series of files the initiator sends a poll message 40 to the responder. At the same time, the initiator starts a timer. The poll message 40 includes a unique identifier for this transfer and details of the data files which it wishes to receive. These details are expressed as parameters which define the type of files which it wishes to receive. The unique identifier may contain the name of the initiator and a serial number for this transfer. If the timer expires before a reply message is received from the responder, the initiator retransmits the poll message 40 to the responder. In the event that the initiator transmits the poll message a preset number of times without receiving a reply message from the responder it ceases to send poll messages and issues an alarm. If the responder is able to generate a list of files which are available for transfer after receiving a poll message 40, it sends a reply message 42. The reply message 42 contains the unique identifier for this transfer as specified in the poll message 40 and also the list of files. For each file, the list gives the name of the file, the size in bytes of the file and the date of creation of the file.

On receiving the reply message 42, the initiator selects those files from the list which it wishes to receive. It then requests the responder to copy each file to it in turn. In FIG. 4, the requests for individual files are shown by dotted lines 44 and the copying operation for each file is shown by a solid, arrow headed line 46. The files are copied using the File Transfer Protocol (ftp) provided on the UNIX operating system mentioned above. It is important to note that the responder does not push any file to the initiator without being specifically requested to do so. Consequently, there is no danger of the initiator receiving a file which it is not prepared to receive. If the initiator fails to copy a file, it proceeds by attempting to copy the next file which it has selected from the list. It continues in this manner until it has attempted to copy all of the files. It then makes a further attempt to copy those files which it has not received. It continues attempting to copy each file up to a preset number of times and, if it fails to copy any file, it raises an alarm.

After copying all the selected files, or attempting to do so up to the present number of times, the initiator sends a message 48 to the responder. This message contains for each selected file the name of the file and a flag representing the outcome of the attempt to copy it. After receiving the message 48, the responder erases the data files which have been successfully copied from its file store 34. In a modification, the responder transfers the files which have been copied successfully to a further file store, not shown, from which they are eventually erased.

Figure 5:
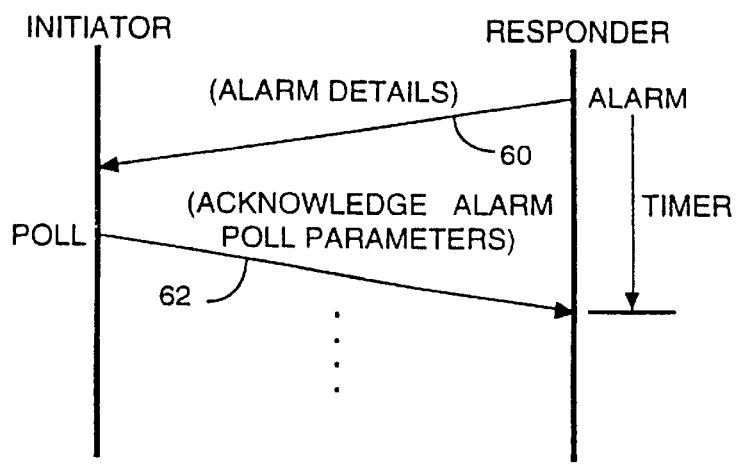
FIG. 5 is a graph showing an alarm service provided by the protocol used in the file transfer mechanism.
Figure 6:
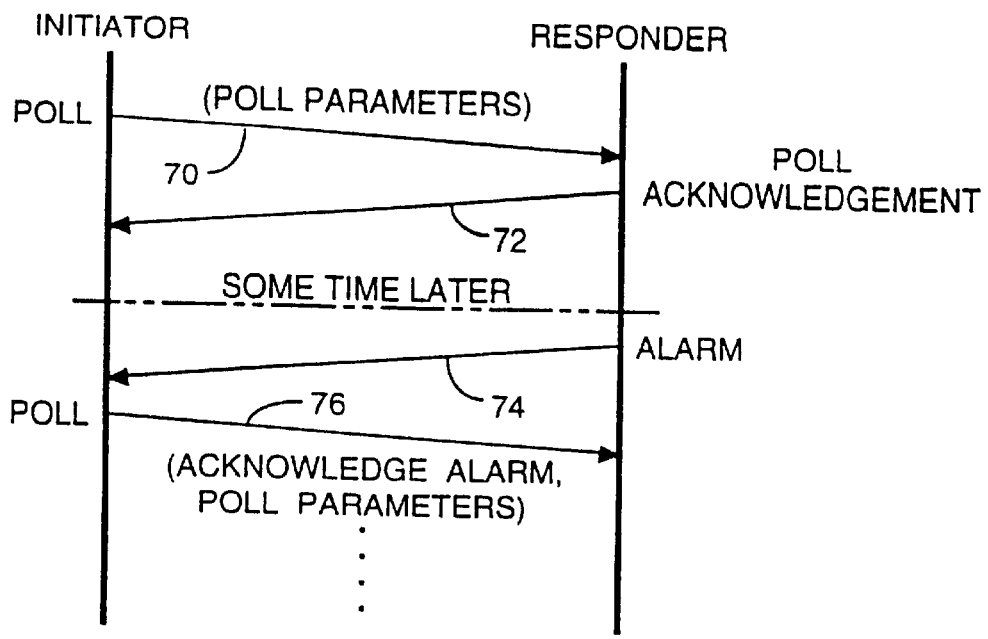
FIG. 6 is a graph illustrating a delayed service provided by the protocol used in the file transfer mechanism.
Figure 7:
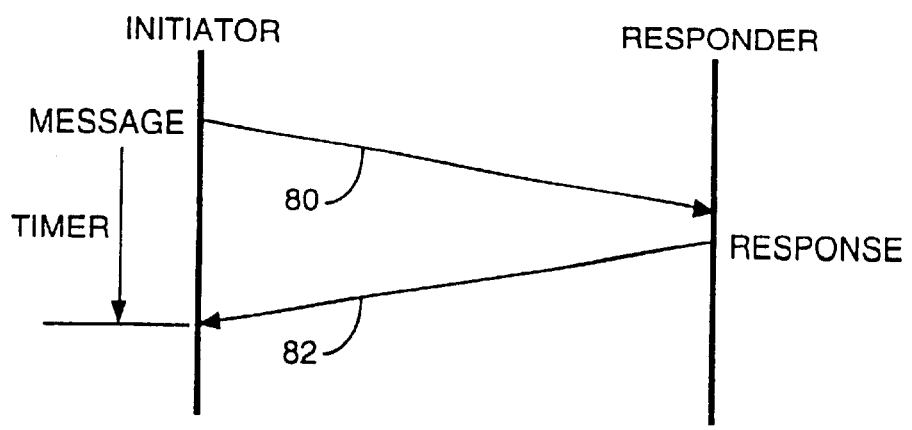
FIG. 7 is a graph showing a message service used in the protocol provided by the file transfer mechanism.

Referring now to FIG. 5, at the commencement of the alarm service, the responder sends an alarm message 60 to the initiator to inform it that it wishes to transfer a series of files to it. The responder may issue the message 60 because a point has been reached in the agreed schedule at which files are to be transmitted, or because an application program has reached a point in its execution at which it wishes to transfer files to the initiator or because the queue of files in the responder for transfer to the initiator has reached a preset threshold. At the time that the responder sends the alarm message 60 to the initiator, it starts a timer. The alarm message 60 contains a unique identifier for the transfer together with an indication that files are available for transfer. If the timer expires before the responder receives a reply from the initiator, it retransmits the alarm message 60 and resets the timer. It retransmits the alarm message 60 upon each expiry of the timer up to a preset number of times and then raises an alarm.

If the initiator is able to receive files, in response to the alarm message 60, it sends a poll message 62 to the responder. The poll message 62 is identical to the poll message 40 described with reference to FIG. 4 except that it contains the unique identifier contained in the alarm message 60 and an acknowledgement that it has received this alarm message. After the responder has received the poll message 62, the alarm service continues in the manner described with reference to the basic service after the responder has received the poll message 40.

Thus, the transfer of messages and data files between the initiator and responder in the alarm service is identical to that in the basic service except that the alarm service includes the alarm message 60 and the poll message 62 uses the unique identifier contained in the alarm message 60 and acknowledges receipt of the alarm message.

The responder uses the delayed service when it requires some time to make files requested by the initiator available for transfer. For example, if the responder contains an application program which is capable of retrieving the requested files from an archive and transferring these to the data store of the associated transfer mechanism, there will be a delay in making these files available for transfer.

The delayed service commences in the same way as the basic service with the initiator sending a poll message 70 to the responder. The poll message 70 is identical to the poll message 40 of the basic service and, if necessary, is retransmitted up to the preset number of times.

After receiving the poll message 70, the responder sends an acknowledgement message 72. The acknowledgement message 72 includes the unique identifier of the poll message 70 and a statement that there will be a delay before files are available for transfer.

After a delay, when either files are available for transfer or the responder has found that it is not able to provide any files of the type requested in the poll message 70, it transmits an alarm message 74 to the initiator. The alarm message 74 contains the unique identifier of the poll message 70 and indicated either that files are available for transfer or that files cannot be made available for transfer. If the responder does not receive a reply to the alarm message 74, it retransmits the alarm message 74 in the same manner as described for the alarm message 60 of the alarm service.

In response to the alarm message 74, the initiator transmits a further poll message 76. The poll message 76 includes the unique identifier of the poll message 70 and also the details of the data files which it wishes to receive.

In response to the poll message 76, the responder transmits a reply message 42 which identical in format to the reply message 42 used in the basic service. The files are then transferred and acknowledged in the same manner as described with reference to the basic service.

Thus, the delayed service is identical to the basic service but additionally includes the poll message 70, the acknowledgement 72 and the alarm message 74. Also, the poll message 76 re-uses the unique identifier from the poll message 70 and acknowledges the alarm message 74.

In each of the basic service, the alarm service and the delayed service, the transfer of data files is controlled by the initiator. More specifically, in each service, the initiator receives a list of files in response to a poll message and thus there is not danger that the initiator will receive a list of files until it is ready to process the list. In each service, after receiving the list, the files are selected and copied under the control of the initiator and so there is no danger that the initiator will receive any file which is not ready to receive. The alarm service provides the further advantage that the responder can indicate that files are ready for transfer.

Although the basic service, alarm service and delayed service have each been described as forming part of the protocol used by the file transfer mechanism, it is to be appreciated that each of these services is also an individual protocol which could be used on its own or could be modified to include further messages.

The message service is used to transfer a comparatively small amount of data from the responder to the initiator. At the commencement of the message service, the initiator sends a request message 80 to the responder and at the same time it starts a timer. The request message 80 contains a unique identifier and also the details of the data required from the responder. If the timer expires before receiving a reply message from the responder, the initiator retransmits the request message 80 and restarts the timer. If no reply is received, it retransmits the request message 80 and restarts the timer up to a preset number of times.

If the responder is able to provide the data, it sends a reply message 82 to the initiator which contains the unique identifier of the request message 80 and the requested data.

For each individual transfer using one of the four services described above, both the initiator and responder create a finite state machine. Each finite state machine changes state after a given event has occurred. Each event is associated with an action process comprising a set of steps.

The events are set out in Table 1. In this table, the suffix "req" denotes the sending of a message and the suffix "ind" denotes the receipt of a message. Each finite state machine can assume six states and these six states are set out in Table 2. It should be noted that the meaning of each state differs between the initiator and the responder.

TABLE 1

| 1. | POLLreq | Application program on the Initiator sends a poll request to the Responder. |
| 2. | POLLind | The Responder receivers a poll request message. |
| 3. | POLLRESPreq | Application program on the Responder sends a poll response back to the Initiator |
| 4. | POLLRESPind | The Initiator receives a poll response message. |
| 5. | POLLACKreq | Application program on the Responder sends a poll acknowledgement back to the Initiator. |
| 6. | POLLACKind | The Initiator receives a poll acknowledgement message. |
| 7. | ACKreq | Application program on the Initiator sends an acknowledgement to the Responder. |

TABLE 1-continued

| 8. | ACKind | The Responder receives an acknowledgement message. |
| 9. | ALARMreq | Application program on the Responder sends an alarm to the Initiator. |
| 10. | ALARMind | Initiator receives an alarm message. |
| 11. | MESSAGEreq | Application program on the Initiator sends a message to the Responder. |
| 12. | MESSAGEind | Responder receives a message. |
| 13. | RESPONSEreq | Application program on the Responder sends a response message back to the Initiator. |
| 14. | RESPONSEind | Initiator receives a response message. |
| 15. | TIMEOUTind | a timer has expired. |

Note that some of the events are handled by the initiator and the others by the Responder.

TABLE 2

| 0. | IDLE | |
| | Initiator: | no activity. |
| | Responder: | no activity. |
| 1. | POLL | |
| | Initiator: | a poll message has been sent to the Responder - awaiting a reply. |
| | Responder: | received and passed on a poll request to application program - awaiting a reply from application program. |
| 2. | ACK | |
| | Initiator: | a poll response message received - awaiting acknowledgement from application program. |
| | Responder: | poll response message sent - awaiting acknowledgement. |
| 3. | DELAY | |
| | Initiator: | a poll acknowledgement received - awaiting an alarm. |
| | Responder: | poll acknowledgement sent - awaiting alarm request from application program. |
| 4. | ALARM | |
| | Initiator: | an alarm received - awaiting a poll request from application program. |
| | Responder: | alarm message sent - awaiting a poll request. |
| 5. | MESSAGE | |
| | Initiator: | a message request sent to Responder - awaiting response. |
| | Responder: | message request received and passed to application program - awaiting response from application program. |

The state tables for the initiator and responder are shown, respectively, in FIGS. 8 and 9. In each of these figures, the events are set out in the left hand column and the six states are set out across the top of the table. The numerals in the boxes indicate the new state following a particular event and the letters and numerals contained in brackets provide a reference to the action process associated with a particular event. Thus, in the initiator state table shown in FIG. 8, following an event POLLreq, the state changes from state 0 (IDLE) to state 1 (POLL). The event POLLreq is associated with an action process A0. The various action processes will now be described. For each action process, the series of steps differs between the initiator and the responder.

Action Process A0

In this action process, the initiator generates a new finite state machine and a unique identifier for the transfer, formats the poll message and sends it to the responder, starts a timer and then enters State 1. The responder generates a new finite state machine, passes the poll message to an application program in the responder and then enters State 1.

Action Process A4

In this action process, the initiator formats a poll message and sends it to the responder, starts a timer and then enters State 1. The responder passes a poll message to an application program and then enters State 1.

Action Process B1

In this action process, the initiator selects the data files which it wishes to receive from the list of data files supplied by the responder, determines the total size of the data files and checks that is has free space available and then copies each file in turn. If it fails to copy a file, it attempts to copy the next one and it repeats its attempt to copy each file up to a preset number of times. It then enters State 2 and prepares to send an acknowledgement message. For this action process, the responder formats a poll response message, sends it to the initiator and then enters State 2.

Action Process C1

In this action process, the initiator changes the state of its finite state machine for the transfer to State 3. In this action process, the responder formats a poll acknowledgment message, send it to the initiator and enters State 3.

Action Process D2

In this action process, the initiator formats an acknowledgement message, sends it to the responder, causes its finite state machine to enter State 0 and then deletes the finite state machine. The responder passes the acknowledgement message to the application program, causes its finite state machine to enter State 0 and then deletes the finite state machine.

Action Process E0

In this action process, the initiator creates a new finite state machine, stores the unique identifier received in the alarm message from the responder, passes the alarm message to the application program and then causes its finite state machine to enter State 4. The responder generates a new finite state machine and a unique identifier for this transfer, formats an alarm message and sends it to the initiator and then causes its finite state machine to enter State 4.

Action Process E3

In this action process, the initiator passes the alarm message to the application program and then causes the finite state machine for this transfer to enter State 4. The responder formats an alarm message, sends it to the initiator and causes its finite state machine for this transfer to enter State 4.

Action Process F0

In this action process, the initiator creates a new finite state machine and an unique identifier for this transfer, formats a message request and sends it to the responder and causes the finite state machine to enter State 5. the responder generates a new finite state machine, passes the request message to an application program and causes the finite state machine to enter State 5.

Action Process G5

In this action process, the initiator passes the response message to an application program, causes the finite state machine to enter State 0 and deletes the finite state machine. The responder formats a response message and sends it to the initiator, causes the finite state machine to enter State 0 and then deletes the finite state machine.

Action Process H1

This action process relates only to the initiator. The initiator increments a counter for counting the number of retries. If the counter has not yet reached the preset maximum value, it formats the poll message, sends it the responder and restarts the timer. If the reset counter has reached the preset maximum number, it provides an indication that there is an error, changes the state of the finite state machine to State 0 and then deletes the finite state machine.

Action Process H4

This action process relates only to the responder. In this action process, the responder increments a counter which counts the number of retries. If the counter has not yet reached a preset maximum value, it formats an alarm message and sends it to the initiator and then restarts the timer. If the counter has reached the preset maximum value, it provides an indication that an error has occurred, causes its finite state machine to enter State 0 and then deletes the finite state machine.

Action Process H5

This action process relates only to the initiator. In this action process, the initiator increments a counter for counting the number of retries. If the counter has not reached a preset maximum value, it formats a request message, sends it to the responder and then restarts the timer. If the counter has reached the preset maximum value, it provides an indication that an error has occurred, changes the state of the finite state machine to State 0 and then deletes the finite state machine.

Computers A and B together with other computers may form part of a system under the overall control of a central computer. Each computer in the system may send a log of each transfer to the central computer. If a queue of data files in a file transfer mechanism of one of the computers reaches an excessive level, the computer can send an indication of this to the central computer which can then take appropriate action to deal with this problem.

What is claimed is:

1. A computer having a file transfer mechanism for providing overall control of each transfer of a series of data files between said computer and another computer, and a file transfer protocol component for ensuring each file is copied in a reliable manner, said file transfer mechanism being at a higher level than the file transfer protocol component, said file transfer mechanism being arranged to transfer a series of files between said computer and another computer in accordance with a protocol for transferring a series of files from a first computer (the transmitting computer) to a second computer (the receiving computer) which includes the following sequence of operations:

(i) The transmitting computer sends a poll message to the receiving computer stating that it has files available for transfer;

(ii) the receiving computer sends a poll message to the transmitting computer asking for a list of files which are available transfer said poll message including at least one parameter defining the type of files which the receiving computer wishes to receive;

(iii) after receiving the poll message, the transmitting computer generates a list of files which are available for transfer and sends a reply message to the receiving computer containing said list of files which are available for transfer;

(iv) the receiving computer selects files from the list received from the transmitting computer and then attempts to copy each selected file in turn; and (v) if the receiving computer fails to copy any file, it continues attempting to copy the file up to a preset number of times.

2. A computer having a file transfer mechanism for providing overall control of each transfer of a series of data files between said computer and another computer, and a file transfer protocol component for ensuring each file is copied in a reliable manner, said file transfer mechanism being at a higher level than the file transfer protocol component, said file transfer mechanism being arranged to transfer a series of files between said computer and another computer in accordance with a protocol for transferring a series of files from a first computer (the transmitting computer) to a second computer (the receiving computer) which includes the following sequence of operation:

(i) the receiving computer sends a poll message to the transmitting computer asking for a list of files which are available for transfer, said poll message including at least one parameter defining the type of files which the receiving computer wishes to receive;

(ii) the transmitting computer sends a reply message to the receiving computer stating there will be a delay in providing said list of files available for transfer;

(iii) after said delay the transmitting computer sends a further message to the receiving computer stating that it has files available for transfer;

(iv) the receiving computer sends a second poll message to the transmitting computer asking for a list of files which are available for transfer;

(v) after receiving the poll message, the transmitting computer generates a list of files which are available for transfer and sends a reply message to the receiving computer containing said list of files which are available for transfer;

(vi) the receiving computer selects files from the list received from the transmitting computer and then attempts to copy each selected file in turn; and (vii) if the receiving computer fails to copy any file, it continues attempting to copy the file up to a preset number of times.

3. A computer as claimed in claim 2, in which the protocol includes an additional operation in which the receiving computer sends a message to the transmitting computer acknowledging the files which have been copies successfully.

4. A computer as claimed in claim 3, in which the transmitting computer deletes the files which have been copied successfully.

5. A computer as claimed in claim 2, in which file transfer mechanism comprises a file store for storing files in a queue in preparation for transmission, a dispatcher for transmitting files and a receive for receiving files.

6. A computer as claimed in claim 5, in which the file transfer mechanism is arranged to transfer files to at least two other computers, said file store being arranged to store files in an individual queue for each of said at least two other computers.

7. A computer as claimed in claim 2, in which, for each sequence of operations for transferring a series of files, the file transfer mechanism creates a finite state machine which changes state at the completion of each operation.

8. A computer as claimed in claim 2, in which said files contain data relating to telecommunications calls.

9. A computer as in claim 8, in which the computer forms part of a telecommunications billing system.

10. A computer as in claim 2, in which the poll message and the reply message each include a unique identifier for the transfer.

11. A file transfer method of providing overall control of each transfer of a series of data files from a first computer (the transmitting computer) to a second computer (the receiving computer) using a file transfer protocol for ensuring that each file is copied in a reliable manner, said file transfer method being at a higher level than the file transfer protocol component, and including the steps of:

(i) the transmitting computer sending a message to the receiving computer stating that it has files available for transfer;

(ii) the receiving computer sending a poll message to the transmitting computer asking for a list of files which are available for transfer, said poll message including at least one parameter defining the type of files which the receiving computer wishes to receive;

(iii) after receiving the poll message, the transmitting computer generates a list of files which are available for transfer and sending a reply message to the receiving computer containing said list of files which are available for transfer;

(iv) the receiving computer selecting files from the list received from the transmitting computer and then attempting to copy each selected file in turn; and (v) if the receiving computer fails to copy any file, it continues attempting to copy the file up to a preset number of times.

12. A file transfer method of providing overall control of each transfer of a series of data files from a first computer (the transmitting computer) to a second computer (the receiving computer) using a file transfer protocol for ensuring that each file is copied in a reliable manner, said file transfer method being at a higher level than the file transfer protocol component, and including the steps of:

(i) the receiving computer sending a poll message to the transmitting computer asking for a list of files which are available for transfer, said poll message including at least one parameter defining the type of files which the receiving computer wishes to receive;

(ii) the transmitting computer sending a reply message to the receiving computer stating that there will be a delay in providing said list of files available for transfer;

(iii) after said delay the transmitting computer sending a further message to the receiving computer stating that it has files available for transfer;

(iv) the receiving computer sending a second poll message to the transmitting computer asking for a list of files which are available for transfer;

(v) after receiving the poll messages, the transmitting computer generates a list of files which are available for transfer and sending a reply message to the receiving computer containing said list of files which are available for transfer;

(vi) the receiving computer selecting files from the list received from the transmitting computer and then attempting to copy each selected file in turn; and (vii) if the receiving computer fails to copy any file, it continues attempting to copy the file up to a preset number of times.

13. A method as claimed in claim 12, including the step of the receiving computer sending a message to the transmitting computer acknowledging the files which have been copied successfully.

14. A method as claimed in claim 13 including the step of the transmitting computer deleting the files which have been copied successfully.

15. A method as claimed in claim 12 in which said files contain data relating to telecommunications calls.

* * * * *